United States Patent Office 3,510,405
Patented May 5, 1970

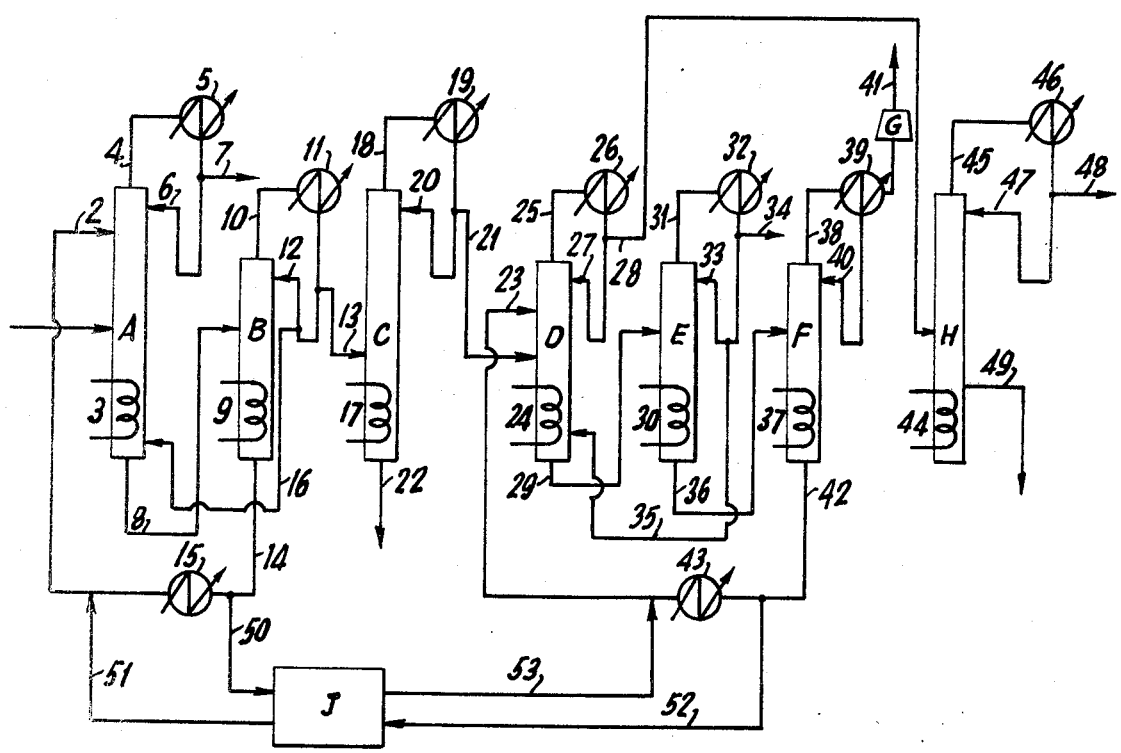

3,510,405
ISOPRENE PURIFICATION PROCESS
Susumu Takao, Kanagawa-ken, and Takeo Koide and Iwaki Nishitai, Toyama-ken, Japan, assignors to The Japanese Geon Co., Ltd., Tokyo, Japan
Filed Nov. 7, 1968, Ser. No. 774,062
Claims priority, application Japan, Nov. 11, 1967, 42/72,223; July 15, 1968, 43/49,067
Int. Cl. B01d 3/00, 3/40; C07c 7/08
U.S. Cl. 203—9
16 Claims

ABSTRACT OF THE DISCLOSURE

In extractive distillations of $C_5$ cuts with dimethylformamide solvent to produce pure isoprene, the cyclopentadiene impurity is kept below a few parts per million by controlling the concentration of dimer in the solvent, and avoiding the decomposition of dimer to cyclopentadiene monomer by handling the last stripping zone at reduced pressure to keep below 140° C.

This invention relates to a process for purifying isoprene. More particularly, this invention is concerned with a process for the recovery of substantially cyclopentadiene-free isoprene from impure isoprene containing cyclopentadiene by extraction distillation. Further this invention is concerned with a process for the recovery of highly pure isoprene from the mixture of $C_5$-hydrocarbons (which mixture will be referred to as "$C_5$-fraction" hereafter).

In the case where an isoprene polymer is to be produced by the catalytic polymerization of isoprene, the starting isoprene is required to be in high purity. For example, the starting isoprene should be as free as possible from butyne-2, isopropenyl acetylene or the like acetylenes or cyclopentadiene, all of which inhibit the desired polymerization reaction. Particularly, cyclopentadiene causes much more adverse effects than the acetylenes do, and so the cyclopentadiene content of the starting isoprene should be kept below several parts per million.

The $C_5$-fraction, which is obtained as byproduct in the production of ethylene by steam cracking or other high temperature treatment of hydrocarbons, usually has a boiling range of from 25° to 70° C. and it contains various kinds of $C_5$-hydrocarbons having different degrees of unsaturation sometimes together with certain $C_4$- or $C_6$- hydrocarbons. Usually, n-pentane, isopentane, pentene-1, 2-methylbutene-1, trans-pentene-2, cis-pentene-2, 2-methylbutene-2, isoprene, trans-pentadiene-1,3, cis-pentadiene-1,3, pentadiene-1,4, butyne-2, isopropenylacetylene, isopropylacetylene, cyclopentane, cyclopentene, cyclopentadiene, etc. are contained in the $C_5$-fraction. Besides the steam cracking of hydrocarbons, there are known the dehydrogenation of isoamylene and/or isopentane and the thermal decomposition of propylene dimer as the processes for obtaining an isoprene-containing $C_5$-fraction commercially.

In order to obtain isoprene from the $C_5$-fraction, especially from the cyclopentadiene-containing isoprene fraction, various methods have been proposed.

An ordinary fractional distillation process is not effective for recovering pure isoprene from the cyclopentadiene-isoprene mixture. Since cyclopentadiene and isoprene have the boiling points of 41° C. and 34° C., respectively, it is necessary to employ a distillation column having a large number of plates with a considerable amount of reflux in order to separate isoprene usable as a raw material for polyisoprene. This is economically impracticable.

A typical process for the removal of cyclopentadiene is based on the fact that cyclopentadiene is dimerized by heating at a temperature over about 80° C. to dicyclopentadiene which is readily separable by distillation. In the actual practice, the starting feedstock is treated at elevated temperature and at elevated pressure thereby to effect the dimerization. Although the treatment enables us to remove substantially all portions of cyclopentadiene, this undesirably causes the considerable loss of isoprene because the isoprene also tends to be polymerized to some extent. Further, the said treatment requires a considerable length of reaction time.

Another effective process for the removal of cyclopentadiene is extractive distillation. When the isoprene feedstock containing cyclopentadiene is subjected to extractive distillation in the presence of an appropriate solvent so as to have isoprene as a distillate, the cyclopentadiene is extracted with the solvent, as the specific volatility of cyclopentadiene is smaller than that of isoprene. However, when the extractive distillation is effected under anhydrous conditions, a part of the cyclopentadiene in the solvent dimerizes to form dicyclopentadiene, a part of which regenerates cyclopentadiene when the solvent eltract is passed through the stripping and subsequent steps. Thus, the regenerated cyclopentadiene entrains to the isoprene distillate when the used solvent is recycled to the extractive distillation step. This phenomenon will be explained more quantitatively below.

When the feedstock containing cyclopentadiene is brought into extractive distillation, a part of cyclopentadiene undesirably dimerizes due to high temperature, so that the dicyclopentadiene content in the solvent gradually increases in response to the progress of said extractive distillation. This increase will cease at a certain critical value which varies depending on the cyclopentadiene concentration of the feedstock and the operational conditions of the process employed. This means that there is an equilibrium between the cyclopentadiene and dicyclopentadiene concentrations in the solvent at a certain part. For example, where a dimethyl formamide-dicyclopentadiene solutions having varying concentrations are kept at 160° C. for a long period of time, the cyclopentadiene and dicyclopentadiene concentrations of these solutions are shown in Table 1.

TABLE 1

| Cyclopentadiene conc. (wt. percent): | Dicyclopentadiene conc. (wt. percent) |
|---|---|
| 0.5 | 2.2 |
| 1.0 | 4.8 |
| 2.0 | 10.6 |
| 3.0 | 17.5 |
| 4.0 | 25.3 |

These data considerably vary depending on the operational temperature employed. If a high temperature is employed, the dicyclopentadiene concentration at which dicyclopentadiene is equilibrated with cyclopentadiene will become low, and if a low temperature is employed, the equilibrium concentration of dicyclopentadiene will increase. In the extractive distillation process using an extractive distillation column and a stripping tower, the dimerization reaction of cyclopentadiene with an increase of the dicyclopentadiene content will be dominant in the extractive distillation column which is generally kept at a relative low temperature, while the decomposition reaction of dicyclopentadiene with a decrease of dicyclopentadiene also occurs in the stripping tower.

The decomposition reaction of dicyclopentadiene in the stripping tower usually takes place gradually at about 120° C. and then becomes remarkable at 140° C. The rate of decomposition is increased in response to the temperature increase. Accordingly, if a solvent having a relatively high boiling point is used, dicyclopentadiene unavoidably remains in the solvent even after the bottom liquid taken from the extractive distillation column is heated in the stripping tower thereby to have the extracted components stripped well. The remaining dicyclopentadiene is decomposed to form a small amount of cyclopentadiene in the solvent. Accordingly, when this solvent is recycled to the top of extractive distillation column, the small amount of cyclopentadiene is flashed and entrained into isoprene or the isoprene-containing fraction obtained as the top distillate of the extractive distillation column.

In order to remove the small amount of dicyclopentadiene entrained in the solvent, stripping of dicyclopentadiene with addition of water has been known. However, if addition of water is made in a process using N-alkylated lower fatty acid amide as a solvent, alike the invention, there occur several disadvantages, i.e. corrosion of the equipment, decomposition of the solvent, etc. Further, the separation of a tar-like polymer from the solvent causes serious clogging of the equipment.

In the prior art, several methods have been proposed for the separation of isoprene from the $C_5$-fraction. With respect to the removal of acetylenes and other hydrocarbons than cyclopentadiene, it has been known to combine a distillation step utilizing the difference in the boiling points of individual components with a so-called extractive distillation step utilizing the difference in the solubilities of individual components. Acetone, acetonitrile, N-methyl pyrrolidone, furfural, etc. are well known effective as extractive solvents. The characteristic feature of these prior art methods is the addition of water to the solvent in order to have improved specific volatility. However, the addition of water causes precipitation of a tar-like polymer which may clog the column and reboiler. Moreover, some solvents added with water cause corrosion of the equipment. Dimethyl formamide which is known as suitable solvent due to its good selectivity and adequate boiling point also is not safe from said corrosion problem if water is added to the solvent.

It is accordingly one object of this invention to provide a commercially acceptable process for the recovery of pure isoprene from cyclopentadiene-containing isoprene. Another object of this invention is to provide a method for recovering highly pure isoprene of the polymerization grade from a highly complexed $C_5$-hydrocarbon mixture.

The present invention is based on our finding that when N-alkylated lower fatty acid amide solvent such as dimethyl formamide is regenerated, prior to its recycling to the extractive distillation column, in a stripping tower under such reduced pressure which makes it possible to effect stripping at a temperature below 140° C., a small amount of cyclopentadiene in the solvent can be removed with the least decomposition of dicyclopentadiene, so that isoprene which is substantially free from cyclopentadiene is obtainable as the top distillate of the extractive distillation column.

In a typical embodiment of this invention (which is referred to as the first embodiment), there is provided a process of purifying isoprene wherein isoprene containing cyclopentadiene is subjected to extractive distillation in the presence of N-alkylated lower fatty acid amide solvent under anhydrous conditions thereby to obtain isoprene as the distillate of said extractive distillation and the cyclopentadiene-containing solvent is heated in a stripping zone thereby to effect solvent regeneration, characterized by that the solvent regeneration is effected, prior to recycling of the solvent to the extractive distillation zone, under a reduced pressure which makes it possible to effect stripping at a temperature below 140° C.

In another typical embodiment of this invention (which is referred to as the second embodiment hereafter), there is provided a process for obtaining highly pure isoprene from a highly complexed $C_5$-fraction which comprises the following steps:

(I) Subjecting the $C_5$-fraction to the first extractive distillation in the presence of N-alkylated lower fatty acid amide under anhydrous conditions thereby to remove pentanes, pentenes and the like materials having lower solubilities in the solvent than isoprene (they are referred to as less soluble hydrocarbons hereafter);

(II) Passing the extracted isoprene and other extracted materials having greater solubilities in the solvent than isoprene (these materials are referred to as more soluble hydrocarbons hereafter) to a distillation zone to remove a major proportion of cyclopentadiene and cyclopentene, cyclopentane, pentadiene-1,3 and the like high boiling hydrocarbons; and (III) Then subjecting the crude isoprene obtained as the distillate of the step (II) to the second extractive distillation in the presence of said solvent under anhydrous conditions thereby to remove the still remaining more soluble hydrocarbons such as cyclopentadiene and isopropenyl-acetylene, the step (III) being characterized by that the solvent used therein is subjected to stripping, prior to recycling of said solvent to said second extractive distillation zone, under a reduced pressure which makes it possible to effect stripping at a temperature below 140° C.

Solvents usable in this invention are N-alkylated lower fatty acid amides of the general formula

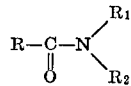

wherein R and $R_1$ individually mean hydrogen atoms and lower alkyl radicals having one to three carbon atoms, and $R_2$ means a lower alkyl radical having one to three carbon atoms). Typically are the N-monoalkyl- or N,N-dialkyl substituted derivatives of formamide, acetamide, propionamide and butyramide. Specific compounds included are methyl formamide, dimethyl formamide, diethyl formamide, dimethyl acetamide, methyl isopropyl acetamide, dimethyl propionamide, ethyl butyramide, etc. Among these, dimethyl formamide, diethyl formamide and dimethyl acetamide are preferred because of their extractive power, boiling point and availability. Particularly, dimethyl formamide is most preferable.

It is desirable to use these solvents added with a compound capable of inhibiting polymerization of conjugated diolefins (e.g. isoprene) or acetylenically and allenically unsaturated hydrocarbons or with a compound functioning as chain transfer agent. For example, furfural, nitrobenzene, o-nitrophenol, nitronaphthalene or the like aromatic nitro compounds, sodium nitrite, t-butyl catechol, N-methyl pyrrolidone, etc. singly or in combination may be added in a polymerization inhibiting amount of 0.01 to 10% by weight to these solvents.

Now detailed explanation will be given hereunder in reference to the first embodiment of the invention.

The starting material used in the first embodiment is a cyclopentadiene-containing isoprene. However, this embodiment is applicable to a fraction containing, in addition to isoprene and cyclopentadiene, any other component of the aforementioned $C_5$-fraction. For example, a feedstock which has been freed from other impurities than cyclopentadiene or a feedstock which contains other impurities than cyclopentadiene can be similarly treated according to the first embodiment of this invention. In the latter case, the less soluble hydrocarbons, e.g. isopentane, pentene-1, etc., are obtained together with isoprene as the top distillate of the extractive distillation column, while the more soluble hydrocarbons, e.g. isopropenyl acetylene, etc. remain in the solvent as well as cyclopentadiene.

The feedstock suitable for use in the first embodiment should desirably have the cyclopentadiene content of less than about 5% by volume, which value may vary depending on the allowable limit of cyclopentadiene in the purified isoprene, the type of a solvent used and the degree of reduced pressure in a stripping tower. The isoprene feedstock which has the above-indicated cyclopentadiene content can be easily obtained even from the $C_5$-fraction containing a considerable amount of cyclopentadiene by ordinary distillation or by simplified extractive distillation.

Extractive distillation process usually consists of an extractive distillation stage using an extractive distillation column and a stripping stage using a stripping tower. The first embodiment of this invention is particularly concerned with an improvement in the stripping stage in the purification of isoprene. Stripping as referred to in the first embodiment is not always conducted in a single stripping tower, and sometimes it is carried out preferably in two or more stripping towers, the number of which may depend on the concentration of cyclopentadiene or other more soluble hydrocarbons in the feedstock. In any way, it is essential that the solvent, prior to its recycle to the extractive distillation column, is regenerated in the stripping tower(s) under such a reduced pressure which makes it possible to effect stripping at a temperature below 140° C. and preferably below 120° C. All the solvents used herein are high boiling compounds. Even dimethyl formamide which has the lowest boiling point among the solvent, has a boiling point of 153° C., and therefore, the degree of reduced pressure as required is at most 530 mm. Hg.

Now the first embodiment of this invention will be explained in conjunction with the accompanying drawing wherein two stripping towers are used.

The cyclopentadiene-containing isoprene is fed through a pipe 21 to the middle part of an extractive distillation column D, in which a solvent introduced via a pipe 23 is flown downwardly. The bottom of this column is heated by way of a heat source 24 (e.g. steam). From the top of the column, cyclopentadiene-free isoprene is obtained as top distillate, which is passed through a pipe 25 to a condenser 26. A part of the condensate is returned as reflux back to the column top through a pipe 27. The purified product is withdrawn through a pipe 28. The solvent which contains cyclopentadiene, a part of isoprene and any other impurities is taken out at the bottom through a pipe 29 and passed to the upper part of the first stripping tower (E) which is operated preferably under ordinary pressure.

In the first stripping tower, heating is made by way of a heat source 30 (e.g. steam) to have a temperature increased up to the boiling point of the solvent. Substantially all portions of cyclopentadiene, isoprene and the like is taken through a pipe 31 attached to the top of the tower and then passed into a condenser 32. A part of the condensate is refluxed through a pipe 33, while the remaining part is taken out of the system through a pipe 34. It is sometimes preferred that said remaining part is partly returned to the extrtctive distillation column D through a pipe 35 so as to maintain material balance. In the solvent, dicyclopentadiene is formed with a certain equilibrium concentration which will depend on the cyclopentadiene concentration of the feedstock and the operational conditions. This dicyclopentadiene partly decomposes to form cyclopentadiene, a major amount of which is stripped in the first stripping tower, while a little amount of the regenerated cyclopentadiene remains in the solvent. Further, decomposition of dicyclopentadiene is observed in the recycling of the stripped solvent to the extractive distillation column. Therefore, the direct recycle of the stripped solvent to the extractive distillation column causes flashing of the remaining cyclopentadiene in the solvent at the column top with the result of contamination of the purified isoprene product.

The solvent which now contains a little amount of cyclopentadiene and an equilibrium concentration of dicyclopentadiene is passed from the bottom of the first stripping tower E through a pipe 36 to the upper part of the second stripping tower F. In the second stripping tower, a heat source 37 provides sufficient heat to strip cyclopentadiene in the solvent, but the operation temperature in the tower is kept at below 140° C. while reduced pressure is applied to the stripping system by way of a pressure-reducing means such as an ejector or vacuum pump G. Cyclopentadiene with solvent vapors is taken out at the top through a pipe 38 and passed into a condenser 39. A part of the condensate is refluxed through a pipe 40, and cyclopentadiene is discharged through a pipe 41. This amount is very small, and so, a small scale pressure-reducing means suffices. The cyclopentadiene-free solvent is passed through a pipe 42 to a heat exchanger 43 to effect cooling to the determined temperature and then recycled to the extractive distillation column.

As mentioned previously, decomposition of dicyclopentadiene, that is, formation of cyclopentadiene, depends on the dicyclopentadiene concentration and boiling point of the solvent. However, if the degree of reduced pressure is sufficiently low to maintain the tower temperature at less than 140° C. (this means that the solvent boils at this temperature), the decomposition rate of dicyclopentadiene is balanced with the stripping rate of cyclopentadiene with the result that the cyclopentadiene in the solvent can be removed. The lower tower temperature or accordingly the more highly reduced pressure is preferable.

Cyclopentadiene in the solvent can be stripped sufficiently and so, substantially cyclopentadiene-free isoprene can be obtained, even when the bottom liquid of the extractive distillation column is fed directly into the second stripping tower without using the first stripping tower. In this case, however, it is necesary to install the reduced pressure-operated stripping tower and pressure-reducing means in a very large scale. This is not economical. However, if the cyclopentadiene and higher acetylene contents of the starting feedstock are very low, omission of the first stripping tower is commercially acceptable.

Now the first embodiment of this invention will be illustrated by way of the examples and comparative examples.

COMPARATIVE EXAMPLE 1

Impure isoprene containing about 0.1% by volume of cyclopentadiene is fed in vapor form at the rate of 10 kg./hr. at the middle part near the lower part of an extractive distillation column having 90 plates. From the upper part of this column, dimethyl formamide which contains 1% by weight of N-methyl pyrrolidone and 1% by weight of furfural both as polymerization inhibitors is flown at the rate of 70 kg./hr. downwardly. Steam heating is made at the bottom of the column. Extractive distillation is operated at the reflux ratio of 30 kg./hr., the pressure of 1.7 atm. and the bottom temperature of 150° C. Purified isoprene is distilled out at the top of the column. Then, the bottom liquid is introduced to the upper part of the first stripping tower having 20 plates and operated under ordinary pressure. The lower part of this tower is applied by heating up to 160° C., thereby to have the extracted materials stripped while the regenerated solvent is recycled to the extractive distillation column. After 20 hours' operation, the dicyclopentadiene concentration of the solvent reaches about 0.1% by weight, and the cyclopentadiene concentration of the solvent at the outlet of the stripping tower is about 30 p.p.m. The cyclopentadiene concentration of the purified isoprene is about 50 p.p.m. The isoprene yield is about 8 kg./hr.

EXAMPLE 1

The same procedures as in the comparative Example 1 are employed with the exception that the bottom liquid of the first stripping tower is introduced into the upper part of the second stripping tower having 20 plates, in which tower stripping is effected with the operation of an ejector sucking stripped gas. Stripping conditions and the results obtained thereby are set forth in Table 2.

TABLE 2

| In the 2nd stripping tower: | | | |
|---|---|---|---|
| Bottom temperature (° C.) | 118 | 136 | 148 |
| Tower pressure (mm. Hg) | 260 | 460 | 660 |
| Cyclopentadiene conc. (p.p.m.) in the solvent at the outlet of the 2nd stripping tower | 0 | Trace | 7 |
| Cyclopentadiene conc. (p.p.m.) in the purified isoprene | 0 | 1 | 15 |

COMPARATIVE EXAMPLE 2

The same procedures as in the Comparative Example 1 are taken with the exception that impure isoprene containing about 1% by volume of cyclopentadiene is used as the starting feedstock. The dicyclopentadiene concentration of the solvent is about 1% by weight and the cyclopentadiene concentration of the solvent at the outlet of the stripping tower is about 200 p.p.m. The cyclopentadiene concentration of the purified isoprene is about 400 p.p.m.

EXAMPLE 2

The same feedstock as in the Comparative Example 2 is used and the same procedures as in the Example 1 are repeated. The results obtained are set forth in Table 3.

TABLE 3

| In the 2nd stripping tower: | | | |
|---|---|---|---|
| Bottom temperature (° C.) | 118 | 136 | 148 |
| Tower pressure (mm. Hg) | 260 | 460 | 660 |
| Cyclopentadiene conc. (p.p.m.) in the solvent at the outlet of the 2nd stripping tower | 0 | 5 | 50 |
| Cyclopentadiene conc. (p.p.m.) in the purified isoprene | 0 | 10 | 100 |

Now explanation will be given in detail with reference to the second embodiment of the invention. The second embodiment of this invention involves the following steps in sequence: namely, (I) the first extractive distillation step, (II) the fractional distillation step for the removal of high boiling hydrocarbons, and (III) the second extractive distillation step. If the starting $C_5$-fraction contains butyne-2 or isopropyl acetylene, the distillation step for the removal of these low boiling hydrocarbons may be included as a final or intermediate step.

In the first extractive distillation step (I), the less soluble hydrocarbons, i.e. isopentene, n-pentane, 3-methyl butene-1, pentene-1, 2-methyl butene-1, pentadiene-1,4, trans- and cis-pentene-1, 2-methyl butene-2, etc. are removed from the starting $C_5$-fraction. This is extrative distillation step is conducted by using the combination of an extractive distillation column and a stripping tower. The less soluble hydrocarbons are discharged from the top of the extractive distillation column, while the solvent-extracted isoprene and the more soluble hydrocarbons are stripped from the solvent in the stripping tower.

In the accompanying drawing, the $C_5$-fraction is fed through a pipe 1 into the middle part of the extractive distillation column A, in which a solvent preferably containing a polymerization inhibitor is flown downwardly from the upper part of the column through a pipe 2. Extractive distillation is conducted by applying heating to the bottom of the column by way of a heating source, e.g. steam 3. The less soluble hydrocarbons are taken as distillate through a pipe 4 attached to the column top and passed to the condenser 5. A part of the condensate is refluxed through a pipe 6 to the column while the remaining less soluble hydrocarbons are withdrawn through a pipe 7 outside the system. The solvent containing isoprene and the more soluble hydrocarbons obtained as bottom liquid is passed through a pipe 8 to a stripping tower B, in which stripping of isoprene and other extracted materials from the solvent is effected by heating with a heat source 9. The stripped gas is passed through a pipe 10 to a condenser 11. A part of the condensate is refluxed through a pipe 12 so as to prevent the solvent loss while its majority is passed through a pipe 13 to the next distillation step. The solvent having been stripped is passed through a pipe 14 to a heat exchanger 15. The cooled solvent is recycled to the extractive distillation column A. Usually, a part of the stripped gas should desirably be recycled through a pipe 16 to the extractive distillation column, preferably its lower part, so as to lower the temperature of the extractive distillation column and to keep good material balance. However, this is not necessary if the starting feedstock has a rather high content of isoprene or the more soluble hydrocarbons.

The particular behavior of cyclopentadiene of the feedstock in the extractive distillation step is already mentioned before. As the result of this particular behavior, dicyclopentadiene exists in the solvent at a certain equilibrium concentration which varies depending on the operation conditions of the extractive distillation column and stripping tower and the cyclopentadiene concentration of the starting feedstock. This equilibrium concentration usually is within the range of 5–20% by weight. If the concentration is high, the correspondingly increased amount of the solvent should better be used since the recycle solvent amount substantially decreases. No other additional rearrangement is required. The major part of the cyclopentadiene in the feedstock and also the major part of the cyclopentadiene formed by said decomposition are stripped in the stripping tower and then they are passed, together with isoprene, to the next distillation step. However, a part of the cyclopentadiene formed by the decomposition of dicyclopentadiene remains in the solvent and then entrains into pentane-pentene fraction when the solvent is recycled at the column top of the extractive distillation column.

The fractional distillation step (II) for the removal of high boiling hydrocarbons serves to remove a major part of cyclopentadiene (so as to have the decreased equilibrium concentration of dicyclopentadiene in the recycle solvent in the second extractive distillation step (III)) and further serves to remove other high boiling hydrocarbons, e.g. trans- and cis-1, 3-pentadienes, cyclopentene, cyclopentane, etc. Isoprene is withdrawn at the top of the distillation column. In the distillation column C for the removal of high boiling hydrocarbons, distillation is effected by heating with a heat source 17 (e.g. steam). Relatively highly pure isoprene having the low cyclopentadiene content is distilled out through a pipe 18 at the top of the column. The top distillate is cooled in a condenser 19 and then a part thereof is refluxed through a pipe 20 to the column, while the other part is fed through a pipe 21 to the next extractive distillation column D. The high boiling hydrocarbons are withdrawn through a pipe 22 from the bottom of the column. The result of this distillation step should be the cyclopentadiene content of less than 5% by volume and preferably less than 1% by volume of the distillate obtained. Usually, however, it is rather easy to obtain the distillate having the cyclopentadiene content of 1000–2000 p.p.m.

The object of the second extractive distillation step (III) is to remove the more soluble hydrocarbons, such as cyclopentadiene and isopropenyl acetylene, from the distillate of the preceding step (relatively high purity isoprene) substantially completely, thereby to obtain isoprene of the polymerization grade. This second extractive distillation step is preferably carried out by using an extractive distillation column, the first stripping tower and the reduced pressure-operated second stripping tower. The distillate of the distillation column C is introduced into the middle part of the extractive distillation column D in which a solvent introduced through a pipe 23 is flown downwardly, said solvent preferably containing a polymerizaiton inhibitor. More preferably, the same solvent and the same inhibitor in the first extractive distillation step are used. The bottom of this column is heated by way of a heat source 24 (e.g. steam) to effect second extractive distillation. From the top of the column, isoprene from which cyclopentadiene, isopropenyl acetylene, etc. have been removed is distilled out. This top distillate is passed through a pipe 25 to a condenser 26. A part of the condensate is refluxed through a pipe 27 to the upper part of the extractive distillation column D, while the remaining part is withdrawn as the product through a pipe 28. The solvent which contains cyclopentadiene, isopropenyl acetylene and some isoprene is taken out at the column bottom through a pipe 29 and passed to the first stripping tower E preferably operated under ordinary pressure. In the first stripping tower, heating is made by way of a heat source 30 (e.g. steam) to have a temperature raised up to the boiling point of the solvent. The dissolved components are stripped in this tower and the stripped gas is passed through a pipe 31 to a condenser 32. A part of the condensate is refluxed through a pipe 33 while the remaining part is taken out of the system through a pipe 34. Preferably this remaining part is partly returned to the extractive distillation column D through a pipe 35 so as to maintain material balance.

This extractive distillation step also suffers from the entrainment of a little amount of cyclopentadiene into the product isoprene if the solvent resulting from the first stripping tower is recycled to the extractive distillation column. In this embodiment, as the major part of cyclopentadiene has been removed in the preceding step, the above-referred entrainment is very scarce, but this is still an obstacle if isoprene of the polymerization grade is desired. For this reason, the procedures of the first embodiment are included in the second embodiment of the invention.

The solvent containing a little amount of cyclopentadiene, which is taken through a pipe 36 from the bottom of the first stripping tower, is passed to the second stripping tower F, in which the little amount of cyclopentadiene is stripped at below 140° C. and preferably at below 120° C. under reduced pressure provided by a pressure-reducing means which is preferably an ejector or vacuum pump G. Cyclopentadiene is distilled out through a pipe 38 attached to the tower top. This is passed to a condensor 39 and the resulting condensate is partly refluxed through a pipe 40 to the tower so as to prevent solvent loss. Very little amount of cyclopentadiene is discharged through the pressure-reducing means G and a pipe 41. The decomposition of dicyclopentadiene is not observed in the solvent because of the low temperature. The solvent substantially free from cyclopentadiene is taken out from the tower bottom and passed through a pipe 42 to a heat exchanger 43 and then recycled through a pipe 23 to the extractive distillation column D. The second stripping tower operated under reduced pressure may be placed just subsequent to the extractive distillation column D, with omission of the first stripping tower E. However, this requires a large capacity of the second stripping tower and a high power of the pressure-reducing means, with economical disadvantages. Therefore, the process as shown in the drawing is more preferable.

The top distillate of the extractive distillation column D is highly pure isoprene. However, if isopropyl acetylene and butyne-2 which adversely affect on the polymerization of isoprene are contained in the starting feedstock, these are difficult to be removed by any of the aforementioned steps. Therefore, if such feedstock as mentioned above is used, it is desirable to further add the fractional distillation step (IV) for the removal of low boiling hydrocarbons. For example, the distillate of the extractive distillation column D is passed through a pipe 28 to a distillation column H for removing low boiling hydrocarbons. In this column H, heating is made by way of a heat source 44. Butyne-2 or isopropyl acetylene, together with some isoprene, is taken out as the top distillate through a pipe 45 and then passed to a condensor 46. The resulting condensate is partly refluxed through a pipe 47. The remaining part of the condensate is discharged through a pipe 48. The product isoprene is recovered through a pipe 49 at the bottom of the column. As shown in the drawing, the distillation step (IV) for the removal of low boiling hydrocarbons should desirably be provided as the final step of the isoprene purification process. However, this is not critical, and the said distillation step (IV) may follow the first extractive distillation step (I) or the distillation step (II).

The solvent which is used in recycle in the two extractive distillation steps usually is contaminated with tar-like polymer and dicyclopentadiene owing to a long-run operation. Therefore, a part of the solvent is removed from the recycling system and purified in a purifying apparatus J. In the solvent purification, dicyclopentadiene can be removed from the solvent as an azeotrope by distillation after addition of water, and tar-like polymers can be removed by simple distillation. For the purification, the solvent is partly withdrawn through pipes 50 and 52 and then, after purification, returned through pipes 51 and 53 to the system. Further, it may be desirable that the solvent used in the first extractive distillation step (I) is partly purified and then passed to the second extractive distillation step (III), while the solvent from the second extractive distillation step is directly transferred for use to the first extractive distillation step (I), because solvent contamination is much more severe in the first extractive distillaiton step than in the second one.

Suitable feedstock for the second embodiment of this invention is a $C_5$-fraction which is obtained as by-product by steam cracking or other high temperature treatment of naphtha or the like petroleum fraction. If this $C_5$-fraction contains considerable amounts of higher boiling materials ($C_6$ or more higher hydrocarbons) or lower boiling materials ($C_4$ or lower hydrocarbons), these should better be removed by any pretreatments including distillation operations.

In the practice of this embodiment, the less soluble hydrocarbons which are usually contained in large quantity in the $C_5$-fraction (about 50-60% by volume, depending on cracking conditions) can be removed in the first extractive distillation step (I). Therefore, the amounts to be treated in the following steps becomes small and this enables us to minimize the scale of apparatus. If the more soluble hydrocarbons firstly are to be removed, the three steps as adopted in this embodiment are quite insufficient to yield isoprene of the polymerization grade. Further, the amounts to be treated and refluxed become larger with an economical disadvantage. Adoption of the distillation step for removing high boiling hydrocarbons as the first step also is not advantageous, because cyclopentadiene and n-pentane form an azeotrope which has a boiling point quite similar to that of isoprene. If isoprene is to be separated from cyclopentadiene in the presence of n-pentane, a distillation column having a large plate number and a large column diameter should necessarily be used with high reflux ratio. This is quite disadvantageous in the economical viewpoint.

Isopropenyl acetylene which is one of the more soluble hydrocarbons has a boiling point very close to that of isoprene. Therefore, it is quite difficult to remove said isopropenyl acetylene from isoprene by simple distillation. Further it is also difficult to remove cyclopentadiene to a few p.p.m. by simple distillation. These are the reasons for necessitating the provision of the second extractive distillation step. However, direct combination of the first and second extractive distillation steps will not enable us to remove cyclopentadiene sufficiently from isoprene in a long-run operation because of said particular behavior of cyclopentadiene which is usually contained in a large quantity into the feedstock. This is quite the reason for the provision of the distillation step for removing high boiling hydrocarbons between the first and second extractive distillation steps. In the distillation step for removing high boiling hydrocarbons, the major part of cyclopentadiene is readily removed together with other high boiling hydrocarbons. Therefore, the solvent contamination is not so severe in the second extraction distillation step.

The second embodiment of this invention is quite unique in the fact that highly pure isoprene can be obtained from the $C_5$-fraction with a high yield by the combination of a few steps merely comprising distillation and extraction distillation operations, without necessitating any complicated operations such as chemical reaction, adsorption, hydrogenation, etc. Further, this embodiment enables us to carry out continuous long-run operation, without any troubles in over all process.

Now it will be illustrated by the following Example 3.

EXAMPLE 3

The $C_5$-fraction (the product of steam cracking of naphtha), the formulation of which is shown in Table 4, is used as the starting feedstock in the process as shown in the flow diagram of the accompanying drawing. The feedstock in gaseous form is fed at the rate of 50 kg./hr. in the 35th plate from the bottom of an extractive distillation column A having 87 plates. From the upper part of this column, dimethyl formamide containing 1% by weight of N-methyl pyrrolidone and 1% by weight of furfural is introduced downwardly at the rate of 170 kg./hr. The column is operated under the following conditions: bottom pressure 2 kg./cm.$^2$G, bottom temperature 150° C., reflux at the column top 80 kg./hr. and return from the stripping tower B 12 kg./hr. The amount and analysis of the top distillate are shown in Table 4. The amount and analysis of the extract when the bottom liquid of the said extractive distillation column is stripped in the stripping tower B having 30 plates, also are set forth in Table 4. The dicyclopentadiene equilibrium concentration in the recycled solvent in this extractive distillation step is 7% by weight. Therefore, the top distillate of the extractive distillation column contains about 0.3% by mole of cyclopentadiene which result from decomposition of dicyclopentadiene in the stripping tower and subsequent piping and flashing of the decomposate in the extractive distillation column. Even after 400 hours' continuous operation, any troubles such as reboiler clogging are not observed without solvent purification.

The fraction obtained from the stripping tower B is passed at the rate of about 20 kg./hr. to a distillation column C having 100 plates in which high boiling hydrocarbons are removed. The operation conditions of the distillation column C are the following: the reflux of the column top 120 kg./hr., the bottom pressure 2 kg./cm$^2$G, and the bottom temperature 80° C. The amounts and analyses of the distillates obtained at the column top and bottom are shown respectively in Table 4. Apparent from the data, the cyclopentadiene amount is reduced to about 1600 p.p.m., and other high boiling hydrocarbons are almost completely removed. In the bottom, dimerization of cyclopentadiene occurs to have an increased dicyclopentadiene content.

The distillate of the distillation column C is introduced in the gaseous form at the rate of about 6 kg./hr. into the 18th plate from the bottom of an extractive distillation column D having 87 plates. In this column, the solvent containing the same polymerization inhibitors as in the first extractive distillation column is flown at the rate of 50 kg./hr. downwardly. The extractive distillation column D is operated under the following conditions: the bottom pressure 2 kg./cm.$^2$G, the bottom temperature 145° C., the reflux at the column top 20 kg./hr., and the return from the stripping tower 7 kg./hr. For the regeneration of the solvent into which the more soluble hydrocarbons have been extracted, the first stripping tower E having 30 plates and operated under ordinary pressure is used in combination with the second stripping tower F having 20 plates and operated at the bottom temperature of 105° C. under the reduced pressure of 160 mm. Hg. by way of the ejector. The amounts and analyses of the distillates obtained at the top of the extractive distillation column D and at the top of the stripping tower E are shown in Table 4. The top distillate of the extractive distillation column is completely free from isopropenyl acetylene. Cyclopentadiene also is removed to the degree of 1 p.p.m., owing to the effect of the reduced pressure-operated second stripping tower. The dicyclopentadiene content of the recycle solvent is about 0.2% by weight.

Then, the top distillate of the extractive distillation column D is fed at the rate of about 5.5 kg./hr. into a distillation column H having 100 plates to attain the removal of low boiling hydrocarbons. This column H is operated at the bottom pressure of 2 kg./cm.$^2$G by using the reflux of 50 kg./hr. at the column top. The amount and analysis of the product isoprene obtained at the bottom of this column are shown in Table 4. The amount and analysis of the distillate obtained at the column top are shown in the same table. The product isoprene is substantially free from cyclopentadiene, acetylenes, 1,3-pentadienes, etc.

The resulted product, isoprene, is used in a polymerization process using a Ziegler type catalyst. Polyisoprene of the commercially acceptable quality is obtained without any troubles.

being stripped from the solvent to obtain isoprene and the more soluble hydrocarbons mixture; subjecting the

TABLE 4

| Distillates (symbol in drawing) | | Feed stock (1) | At the top of the extractive distillation column (A) (7) | At the top of the stripping tower (B) (13) | At the top of the distillation column (C) (21) | At the bottom of the distillation column (C) (22) | At the top of the extractive distillation column (D) (28) | At the top of the first stripping tower (E) (34) | At the top of the distillation column (H) (48) | Product isoprene (49) |
|---|---|---|---|---|---|---|---|---|---|---|
| Amount (kg./hr.) | | 50.0 | 29.90 | 20.10 | 6.14 | 13.96 | 5.47 | 0.67 | 0.54 | 4.93 |
| Analysis (mol. percent) (B.P. ° C.): | | | | | | | | | | |
| C₄-fraction with isopentane | 28 | 26.0 | 43.4 | | | | | | | |
| n-Pentane | 36 | 21.0 | 35.1 | | | | | | | |
| 3-methylbutene-1 | 20 | 0.5 | 0.8 | | | | | | | |
| Pentene-1 | 30.1 | 2.5 | 4.2 | | | | | | | |
| 2-methylbutene-1 | 31.0 | 3.7 | 6.2 | | | | | | | |
| Pentadiene-1,4 | 38.4 | 1.0 | 1.7 | | | | | | | |
| Trans-pentene-1 | 36.3 | 1.7 | 2.8 | 0.1 | 0.16 | 0.1 | 0.18 | | | 0.20 |
| Cis-pentene-1 | 36.9 | 1.1 | 1.8 | 0.1 | 0.16 | 0.1 | 0.18 | | | 0.20 |
| 2-methylbutene-2 | 38.4 | 2.2 | 3.3 | 0.6 | 1.14 | 0.3 | 1.28 | | | 1.42 |
| Isoprene | 34.0 | 12.6 | 0.4 | 30.7 | 96.76 | 1.7 | 97.63 | 89.5 | 92.6 | 98.18 |
| 2-methylpentane | 60.2 | 3.0 | | 7.5 | | 10.7 | | | | |
| 3-methylpentane | 63.3 | 2.0 | | 5.0 | | 7.2 | | | | |
| n-Hexane | 68.8 | 2.5 | | 6.2 | | 9.0 | | | | |
| Cyclopentane | 49.0 | 1.0 | | 2.5 | | 3.6 | | | | |
| Trans-pentadiene-1,3 | 42.1 | 3.5 | | 8.7 | (¹) | 12.5 | Trace | | | Trace |
| Cyclopentene | 44.0 | 2.5 | | 6.2 | | 9.0 | | | | |
| Cis-pentadiene-1,3 | 43.6 | 3.0 | | 7.5 | (²) | 10.7 | Trace | | | Trace |
| Cyclopentadiene | 41.0 | 8.5 | 0.3 | 20.7 | 0.16 | 21.4 | (³) | 1.5 | | (³) |
| Isopropenylacetylene | 33 | 0.1 | | 0.25 | 0.81 | | | 7.5 | | |
| Butyne-2 | 27.2 | 0.1 | | 0.25 | 0.81 | | 0.73 | 1.5 | 7.4 | (²) |
| Dicyclopentadiene and other high boiling hydrocarbons | | 1.5 | | 3.7 | | 13.7 | | | | |

¹ 20 p.p.m.  ² 10 p.p.m.  ³ 1 p.p.m.

What we claim is:

1. A process for purifying isoprene which comprises subjecting cyclopentadiene-containing isoprene to extractive distillation in the presence of N-alkylated lower fatty acid amide as a solvent under anhydrous conditions thereby to obtain cyclopentadiene-free isoprene as distillate and then subjecting the cyclopentadiene-containing solvent to stripping by heating thereby to regenerate the solvent in one or more stripping zones, characterized by that the last solvent regeneration is effected, prior to the recycling of the regenerated solvent to the extractive distillation zone, under a reduced pressure sufficiently low to effect stripping at a temperature of less than 140° C.

2. The process of claim 1 wherein the cyclopentadiene-containing isoprene has the cyclopentadiene content of less than about 5% by volume.

3. The process of claim 1 wherein the last solvent regeneration is effected under a reduced pressure sufficiently low to effect stripping at a temperature of less than 120° C.

4. The process of claim 1 wherein the solvent regeneration is effected in two stripping zones, the first stripping being operated under ordinary pressure, and the second stripping being operated under said reduced pressure.

5. The process of claim 4 wherein said reduced pressure is made by way of ejector.

6. The process of claim 1 wherein the solvent is dimethyl formamide.

7. The process of claim 6 wherein the dimethyl formamide is used in an admixture with a polymerization inhibiting amount of N-methyl pyrrolidone or furfural.

8. A process for recovering highly pure isoprene from a C₅-hydrocarbon mixture, which comprises subjecting the C₅-hydrocarbon mixture to first extractive distillation in the presence of N-alkylated lower fatty acid amide solvent under anhydrous conditions thereby to remove the hydrocarbons less soluble than isoprene as distillate and to obtain the solvent containing isoprene and hydrocarbons more soluble than isoprene as extract, the extract mixture to fractional distillation thereby to remove a major part of cyclopentadiene and hydrocarbons boiling at a higher temperature than the boiling point of isoprene; further subjecting the resulted distillate to second extractive distillation in the presence of said solvent under anhydrous conditions thereby to recover isoprene as distillate and to take out the solvent containing the still remaining cyclopentadiene and the more soluble hydrocarbons as extract; and then subjecting the extract-containing solvent to stripping by heating thereby to regenerate the solvent in one or more stripping zone, the last solvent regeneration being effected, prior to the recycling of regenerated solvent to the second extractive distillation zone, under a reduced pressure sufficiently low to effect stripping at a temperature of less than 140° C.

9. The process of claim 8 wherein the C₅-hydrocarbon mixture is a C₅-fraction from steam cracking.

10. The process of claim 8 wherein the last solvent regeneration is effected under a reduced pressure sufficiently low to effect stripping at a temperature of less than 120° C.

11. The process of claim 8 wherein the solvent regeneration is effected in two stripping zone, the first stripping being operated under ordinary pressure, and the second stripping being operated under said reduced pressure.

12. The process of claim 11 wherein said reduced pressure is made by way of ejector.

13. The process of claim 8 wherein the solvents used in the first and second extractive distillation are both dimethylformamide.

14. The process of claim 13 wherein the dimethylformamide is used in an admixture with a polymerization inhibiting amount of N-methyl pyrrolidone or furfural.

15. The process of claim 8 wherein the resulted distillate obtained by the fractional distillation has the cyclopentadiene content of less than 1% by volume.

16. The process of claim 8 wherein the isoprene obtained by the second extractive distillation as distillate is further subjected to fractional distillation thereby to remove a hydrocarbon boiling at a lower temperature than the boiling point of isoprene.

References Cited

UNITED STATES PATENTS

| | | | |
|---|---|---|---|
| 2,387,993 | 10/1945 | Hepp | 260—674 |
| 2,600,106 | 6/1952 | Garrett | 260—681.5 X |
| 3,013,952 | 12/1961 | Clay | 203—60 |
| 3,320,138 | 5/1967 | Brandt et al. | 203—58 |
| 3,301,915 | 1/1967 | King et al. | 260—681.5 |
| 3,317,627 | 5/1967 | King et al. | 260—681.5 |
| 3,344,198 | 9/1967 | Weitz et al. | 260—666 |
| 3,350,282 | 10/1967 | Davis et al. | 203—54 |
| 3,350,283 | 10/1967 | Makin et al. | 203—54 |
| 3,439,060 | 4/1969 | Kempton | 260—681.5 |

DELBERT E. GANTZ, Primary Examiner

G. E. SCHMITKONS, Assistant Examiner

U.S. Cl. X.R.

203—60, 78, 81; 260—681.5